United States Patent [19]
Golkar

[11] Patent Number: 4,793,068
[45] Date of Patent: Dec. 27, 1988

[54] SPACER FOR USE IN SETTING TILE

[76] Inventor: Homayun Golkar, 2125 Sherington Pl., #C 106, Newport Beach, Calif. 92663

[21] Appl. No.: 132,766
[22] Filed: Dec. 14, 1987
[51] Int. Cl.[4] ............................................. G01B 5/14
[52] U.S. Cl. ...................................... 33/526; 33/518; 33/567
[58] Field of Search ......... 33/526, 527, 562, DIG. 20, 33/518, 567

[56] References Cited
U.S. PATENT DOCUMENTS 2,930,135  3/1960  Rodtz ..................................... 33/518
3,735,497  5/1973  Boettcher ............................... 33/526

Primary Examiner—William D. Martin, Jr.
Attorney, Agent, or Firm—Edward E. Roberts

[57] ABSTRACT

A spacer for use in aligning and spacing tiles relative to each other, the spacer being cross-shaped, T-shaped, or bar-shaped, with four, three or two arms, respectively, each arm of which, in cross-section, is provided with a lower surface of tapered or contoured configuration to provide a surface in contact with the adhesive on the supporting surface of smaller area than the total arm area. The opposing vertical edges of the arms, which are in contact with the sides of the tiles are narrow in height and, while providing the desired spacing between tiles, provides a narrow area of contact between the arm and the tile to minimize frictional engagement between the abutting surfaces. At the juncture of the arms, there is provided an upwardly extending rod-like projection which serves as a handle to facilitate removal. Due to the tapered sidewalls of the arms, with the centrally and upwardly disposed handle member, a gentle rocking motion may be employed to loosen the spacer from the adhesive to facilitate removal, with the narrow edge surface of the arms in contact with facing sides of the tile providing a minimum amount of frictional resistance to withdrawal.

16 Claims, 2 Drawing Sheets

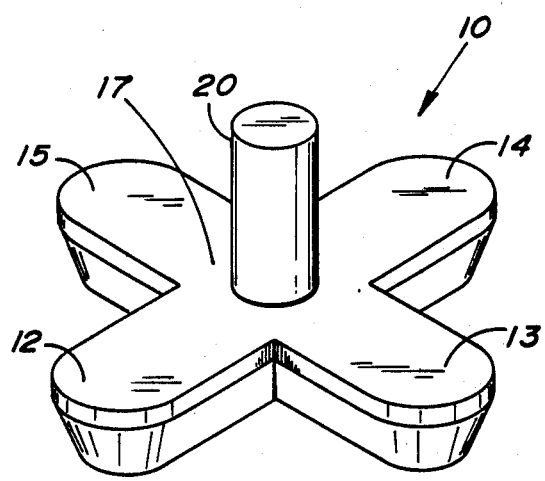
FIG. 1
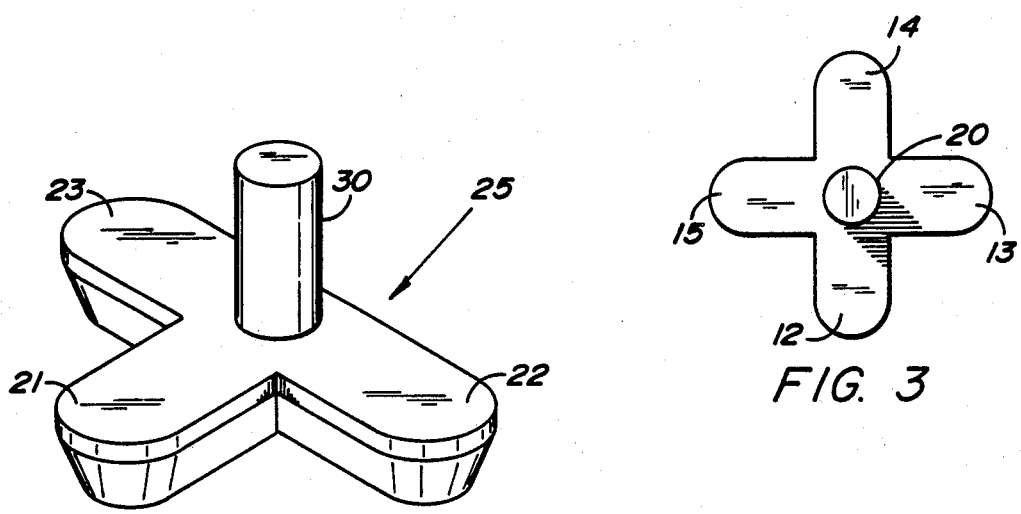
FIG. 2
FIG. 3
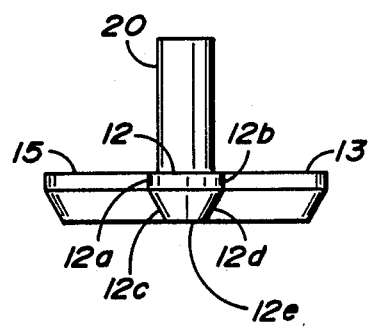
FIG. 4
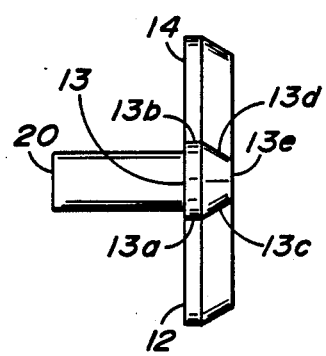
FIG. 5

SPACER FOR USE IN SETTING TILE

BACKGROUND OF THE INVENTION

The background of the invention will be discussed in two parts.

1. Field of the Invention

This invention relates to spacers, and more particularly to spacers for use in installing ceramic or clay tile on a floor or the like.

2. Description of the Prior Art

Ceramic or clay tile is installed, usually on prepared surface, such as concrete flooring, or other prepared floor or wall surfaces, by first applying a layer of suitable adhesive material, usually a concrete based adhesive. The tiles are normally square, but my be rectangular in form, and of a thickness between one-eighth and three-eighths of an inch. With reference to an alignment mark, such as a blue chalk line, a straightedge, a level or the like, the tile is then placed in position in a row with spacers at the junction of two or more tiles.

Such spacers are normally formed of a plastic material with a relatively high amount of flexure and are used for aligning and spacing tiles relative to each other on the supporting surface. The spacers are normally cross-shaped or cruciform in plan view, that is, in the nature of a "+" symbol. When tiles are placed next to a wall or the like, one leg of the spacer may be cut off with scissors or snips to create a "T" configuration. When the tiles are arranged in a matrix, such as a checkerboard pattern, a cruciform spacer is placed at the junction of the four adjacent corners of four adjacent tiles, or in the case of a wall area, a T-shaped spacer is used.

The use of the spacers performs two functions. In the first place, the spacers provide a uniform or consistent spacing between the tiles, thus providing a geometrically correct appearance. The second function, with respect to four adjacent tiles, is alignment, that is, to assist in maintaining the corners correct, such that the tiles will be oriented properly relative to one another with respect to the mutually perpendicular spacing requirements.

After the base, or adhesive coat sets, the spacers are then removed. This is not done in all cases, but is especially important when the tile is thinner, and there is a small difference between the height of the spacer and the thickness of the tile. Spacers in current use are about three-sixteenths of an inch, or slightly more, in thickness. The width of the individual legs determines the spacing between tiles, and may typically be three-sixteenths of an inch to one-fourth of an inch, or sometimes up to five-eighths of an inch or more.

In any event, some form of tool is normally employed to remove the spacers, such as a small pry bar or a screwdriver or the like. The removal of the spacers is complicated by two things, one being that with the relatively flat bottom surface, the spacer adheres to the adhesive.

Secondly, with the flexible nature of the spacers, and, depending on the skill of the installer, there is a likelihood that adjacent tiles will be in frictional abutting relation with the spacer essentially wedged in between the tiles. In such instances, when an attempt is made to remove the spacers, there is resistance. With the use of metal tools, such as a screwdriver, to assist in the removal, there is another problem, which relates to the high probability of chipping the edges of the tiles during such removal, that may readily occur with ceramic tiles. When tiles are chipped, the installer has a problem of either replacing the chipped tiles, or risking the wrath of the owner for a non-workmanlike job. In either event, there is time and expense involved. The final step in the process is to install grout in the space between the tiles.

If the spacers are left in place when the grout is installed, the area which includes the spacer will have less grout than the surrounding spaces due to the thickness of the spacer. With less grout, and with the resilience of the spacer, the likelihood exits of cracking of the grout at these locations. In addition, when grout is applied it has a consistency which enables it to fill voids, that is, it can flow. In addition, a squeegee or trowel is used to apply some pressure to the grout when filling the spaces, to force it into the voids. The spacers are located at the corners of the tile, and, if there is any space at the lower surface where it contacts the adhesive, there is an additional risk of cracking of the tile at the corners on failure to remove the spacers.

A conventional spacer for use with tile is shown and described in U.S. Pat. No. 2,031,684, entitled "Tile Spacer", which issued to Berger on Feb. 25, 1936.

Another tile spacer for enabling the removal thereof after tile installation is shown and described in U.S. Pat. No. 2,930,135, entitled "Tile Setting Gauge", which issued to Rodtz, Sr. on Mar. 29, 1960. In this spacer member, the spacer is generally cross-shaped or T-shaped and, in one embodiment, has a uniform height throughout, which height is about twice that of the the tile to provide a handle for removal of the spacer. The flooring contacting portion is provided with depending ends, referred to as edge-like bearing points, which are intended to hold the lower surface of the spacer elevated above the adhesive covered supporting surface. In a second embodiment, the two, three and four arms of the spacer in contact with the supporting surface are of a lesser height with a wing shaped projection providing a gripping handle for removal. In all of the embodiments, the vertical sides are parallel to one another, that is, the arms which intrude into the space between tiles are of uniform cross-section. As a result, if the tiles are placed in close abutting relation in the corner spaces, there is a high degree of friction which provides resistance to withdrawl of the spacers. Furthermore, with the configuration of the spacers an inordinate amount of material is required for each spacer.

Another spacer for use with tile is shown and described in U.S. Pat. No. 4,503,654, entitled "Method and Apparatus for Laying Tile", which patent issued to Cosentino on Mar. 12, 1985, this device being constructed as a non-removable spacer.

Other patents which show spacing or aligning type devices for concrete block or glass building blocks are: U.S. Pat. No. 2,797,495, entitled "Glass Building Block Aligner", which issued to Walston on July 2, 1957; and U.S. Pat. No. 4,408,398, entitled "Gauge for Laying Blocks", which issued to Glaze on Oct. 11, 1983.

In accordance with an aspect of the present invention, it is an object to provide a new and improved economical spacer for tile laying which enables the ready removal thereof.

SUMMARY OF THE INVENTION

In accordance with a preferred embodiment of the present invention, there is provided a tile spacer for aligning and spacing tiles relative to each other, the spacer being cross-shaped or T-shaped with four or three arms, respectively, each arm of which, in cross-section, is provided with a lower surface of tapered or contoured configuration to provide a surface in contact with the adhesive on the supporting surface of smaller area than the total arm area. The opposing vertical edges of the arms, which are in contact with the sides of the tiles are narrow in height and, while providing the desired spacing between tiles, provides a narrow area of contact between the arm and the tile to minimize frictional engagement between the abutting surfaces.

At the juncture of the arms, there is provided an upwardly extending rod-like projection which serves as a handle to facilitate removal. Due to the tapered sidewalls of the arms, with the centrally and upwardly disposed handle member, a gentle rocking motion may be employed to loosen the spacer from the adhesive to facilitate removal, with the narrow edge surface of the arms in contact with facing sides of the tile providing a minimum amount of frictional resistance to withdrawal.

The foregoing and other objects of the invention will become apparent from a reading of the specification, when taken in conjunction with the drawings, in which like reference numerals refer to like elements in the several views.

BRIEF DESCRIPTION OF THE DRAWINGS

FIG. 1 is a perspective view of a cross-shaped tile spacer in accordance with the invention;

FIG. 2 is a perspective view of a T-shaped tile spacer in accordance with the invention, which spacer can be utilized against a wall or baseboard;

FIG. 3 is a plan view of the spacer of FIG. 1;

FIG. 4 is a front elevational view of the spacer of FIG. 3;

FIG. 5 is a side elevational view of the spacer of FIG. 3;

DESCRIPTION OF THE PREFERRED EMBODIMENT

Figure 6:
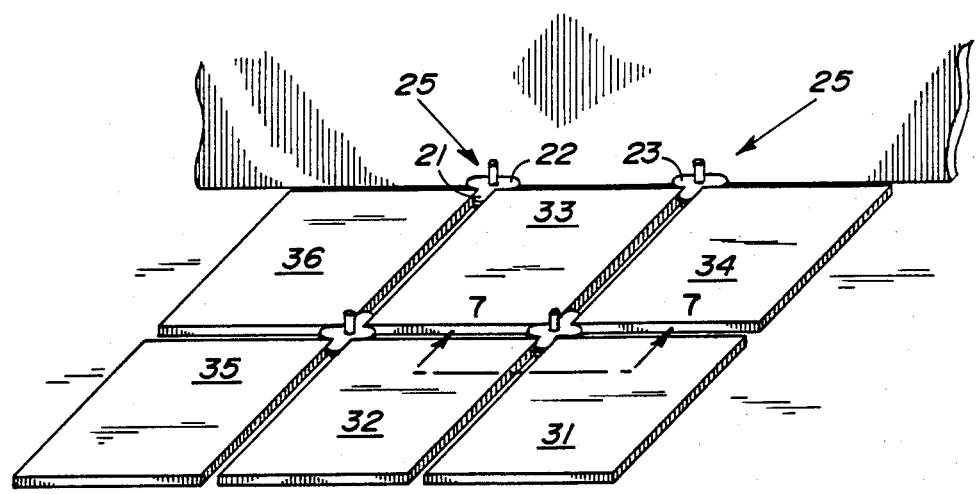
FIG. 6 is a perspective view of a portion of a surface having installed thereon tile with the spacers of FIGS. 1 and 2.

Referring now to the drawings, and particularly FIGS. 1 and 3 through 6, there is shown a cross-shaped spacer, generally designated 10, which may be constructed of any suitable material, and is preferably formed of a plastic material which may be readily produced, such as by molding. In this spacer member 10, there is a main body portion which includes four molded integrally formed radially extending arms 12, 13, 14 and 15, which are disposed at right angles to one another to form a cruciform or cross-shaped configuration, the arms 12–15 serving as spacers at the adjacently disposed corners of any four tiles, such as tiles 31–35 in FIG. 6. The upper surface of all four arms 12–15 lie in a common plane and form a generally planar upper surface. At the intersection or junction 17 of the four arms, there is provided an integrally formed upwardly extending rod-like projection 20, which serves as a gripping means or handle, both for placement, as well as for removal of the spacer 10.

The projection 20 is generally perpendicular to the plane of the upper surface and disposed generally centrally relative to the plane, that is centrally positioned within the area of the junction 17. In the preferred form, the projection 20 has a width or diameter smaller than the maximum dimension of the junction area 17, that is a line drawn between diagonally opposite inside corners between arms 12–15. In the embodiment shown, each arm 12–15 is virtually identically configured and all are of equal length. The distal ends of the arms 12–15 are rounded and downwardly tapered to facilitate positioning and removal. The inside corners, that is, the space between adjacent arms is likewise radiused or rounded.

The undersurface of each arm is likewise generally identically configured and, as can be seen in FIGS. 1, 4 and 5, in cross-section, the arms are wedge-shaped or somewhat U-shaped with the bight portion thereof positioned on the side opposite the rod 20. Specifically, by reference to arm 12 in FIG. 4 and arm 13 in FIG. 5, the side of the arms are formed of two portions, a first upper side portion being the side edges 12a and 12b of the arm 12 and the side edges 13a and 13b of the arm 13, which side portions are generally parallel for a very short distance, that is these edges are generally perpendicular to the plane of the upper surface of all arms.

Figure 9:
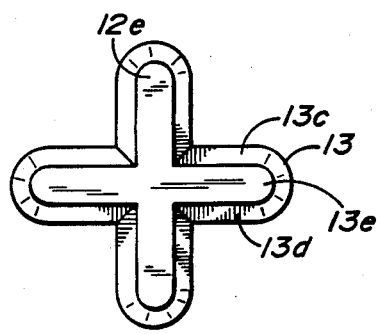
FIG. 9 is a bottom view of the spacer of FIG. 1.

From there, as further illustrated in FIG. 9, the sides have the second portion which continue downwards at an angle, that is the lower side portions 12c and 12d of spacer 12 are tapered and downwardly generally convergent, terminating at the bottom 12e in a plane generally parallel to the plane of the upper surface. The bottom 12e is thus a narrow strip of surface for contact with the cement or adhesive in contact with the support surface or floor. The angle of the taper of the side portions 12c and 12d is approximately sixty degrees to the plane of the bottom 12e.

Dimensionally, and by way of example only, in one size of spacer 10, the lateral width of the arms 12–15 may be one-fourth of an inch. The distal ends are rounded to a radius of three-eighths of an inch, with the depth of each arm being about five-sixteenths of an inch. The depth or thickness of the side edges 12a and 12b is about three-thirty-seconds of an inch, with the width of the bottom 12e being about one-half, or less, the width of the top surface of the arm.

The arm 13 in FIG. 5 is likewise configured with parallel relatively shallow side edges 13a and 13b, with tapered convergent lower side portions 13c and 13d, with a generally planar bottom 13e of a width much less than the width of the upper surface of the arm 13. The other arms 14 and 15 are likewise configured. It is to be understood that the terms upper and lower, upwardly and downwardly are with reference to the normal orientation of the spacer 10 in use when the supporting surface is a floor.

FIG. 2 depicts another spacer, generally designated 25, which is generally T-shaped in plan elevation, and includes three arms 21, 22 and 23, with arm 21 mutually perpendicular to arms 22 and 23, with arms 22 and 23 in general alignment. The upper surfaces of the three arms 21–23 lie in a common plane, and at the junction of the three arms 21–23, there is provided an upwardly extending rod-like gripping projection 30, which is generally identical to the projection 20. In cross-section, the arms 21–23 are configured the same as the arms 12–15 as above described. The spacer 25 is a "wall spacer", that is, as shown in FIG. 6, the spacers 25 would be positioned between the tiles 33 and 36 and 33 and 34, with the aligned arms 22 and 23 adjacent the wall, and the intermediate arm 21 positioned between adjacent tiles.

Figure 8:
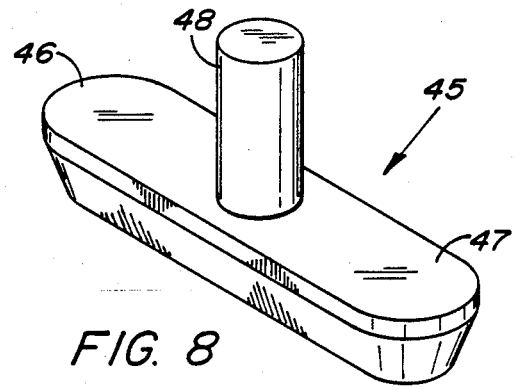
FIG. 8 is a perspective view of a bar-shaped tile spacer in accordance with the invention.

FIG. 8 depicts another spacer, generally designated 45, which is generally bar-shaped in plan elevation, and includes two arms 46 and 47 which are in general alignment. The upper surfaces of the two arms 46,47 lie in a common plane, and at the junction thereof, there is provided an upwardly extending rod-like gripping projection 48, which is generally identical to the projections 20 and 30. In cross-section, the arms 46,47 are configured the same as the arms 12–15 as above described.

Figure 7:
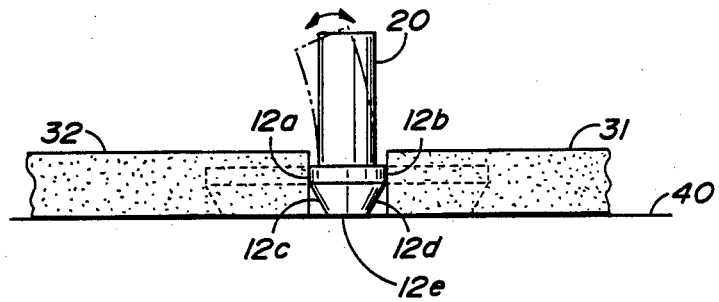
FIG. 7 is a partial cross-sectional view of adjacent tiles with the spacer of FIG. 1 therebetween as viewed generally along line 7—7 of FIG. 6.

In use, the spacer 10,25 or 45 can be conveniently gripped by the handle or projection 20,30 or 48 and inserted into position as the tile is being set into place on the supporting surface, such as floor covered with a thin layer of cement or adhesive. Upon insertion, as shown in FIG. 7, the lateral edges 12a and 12b define the spacing between the tiles 31 and 32, with the bottom 12e occupying a small portion of the lateral spacing between tiles.

When removal is desired, the projection acts as a lever arm which may be used to rock the spacer to loosen it, with the relatively narrow bottom 12e acting as a pivot surface to assist in dislodgment. Furthermore, the projection may be rocked in a cross-direction (as indicated by the double ended arrow thereabove) or, in a mutually perpendicular direction in line with the space between tiles, or even rotated, to facilitate the disengagement of the narrowly configured bottom surface 12e from the adhesive covered surface 40 and enable lifting of the spacer from the space between tiles 31 and 32.

The side edges 12a and 12b, being relatively shallow in depth, provide little frictional resistance between these edges and the adjacent vertical edge surfaces of the tiles to assist in the removal. In a preferred embodiment, the material selected for the spacers would be a flexible plastic material having a flexing comparable to a hard rubber eraser, which would provide some degree of flexure, yet sufficient rigidity. The spacers are formed as unitary members, preferably by molding and, with the configuration shown and described, may be produced economically, with maximum functional utilization of a minimum amount of material, thus providing an economical, reusable and easily usable spacer for installing tile on a supporting surface.

While there have been shown and described preferred embodiments, it is to be understood that various other adaptations and modifications may be made without departing from the spirit and scope of the invention.

What is claimed is:

1. A unitary spacer member for aligning and spacing tiles relative to each other when the tiles are placed on an adhesive on a supporting surface, said spacer member comprising:
    at least three generally identical arms of generally the same width and depth intersecting at a junction area, two of said arms being in general alignment and at least one of said arms being at a right angle relative to the two aligned arms, each of said arms having a generally identical cross-section with the sides thereof having a first side portion including opposing generally parallel side edges narrow in dimension relative to the depth, and second side portions converging to a narrow bottom, said first side portions defining the spacing between adjacent tiles while providing narrow edge contact with the tiles with said narrow bottom of the spacer placed in bottom surface contact with the adhesive on the supporting surface and said first side portions in abutting relation with adjacent tiles; and
    an integrally formed gripping means projecting from the upper surface of the spacer centrally relative to the junction of said arms, said gripping means being adapted to be gripped by the fingers for placing in and removing said member from between the tiles following the alignment of the latter on the supporting surface, and during removal of said member, said projecting gripping means provides a lever which, in conjunction with said narrow bottom, enables rocking movement of said member to facilitate detachment from within the space between the tiles.

2. The spacer member of claim 1 wherein said plurality of arms include four equiangularly disposed radially extending arms.

3. The spacer member of claim 1 wherein said gripping means is a rod-like projection.

4. The spacer member of claim 3 wherein said projection has a diameter smaller than the largest dimension of said junction area.

5. The spacer member of claim 4 wherein said plurality of arms includes four equiangularly disposed radially extending arms.

6. The spacer member of claim 5 wherein each of said arms is of the same length and the distal ends thereof are rounded.

7. The spacer member of claim 6 wherein the distal ends of said arms are tapered in the direction of the depth thereof.

8. A unitary spacer member for aligning and spacing tiles relative to each other on a supporting surface, said spacer member comprising:
    a main body portion including a plurality of arms the same general width and depth extending outwardly relative to a junction area, the upper surfaces of said arms defining a common plane, each of said arms having a generally identical generally U-shaped cross-section with the bight portion thereof forming a bottom for contact with the support surface and the upper opposing edges thereof defining the spacing between adjacent tiles while providing narrow edge contact with the tiles; and
    an integrally formed gripping means projecting from the upper surface of said junction area and having a dimension less than the dimension of said junction area, said gripping means being adapted to be gripped by the fingers for placing in and removing said member from between the tiles following the alignment of the latter on the supporting surface, and during removal of said member, said gripping means providing a lever which, in conjunction with said bottom, enables rocking movement of said member to facilitate detachment from within the space between the tiles.

9. The spacer member of claim 8 wherein said plurality of arms include four equiangularly disposed radially extending arms.

10. The spacer member of claim 9 wherein said gripping means is a rod-like projection.

11. The spacer member of claim 10 wherein said projection has a diameter smaller than the largest dimension of said junction area.

12. The spacer member of claim 11 wherein said plurality of arms includes four equiangularly disposed radially extending arms.

13. The spacer member of claim 8 wherein each of said arms is of the same length and the distal ends thereof are rounded.

14. The spacer member of claim 13 wherein the distal ends of said arms are tapered in the direction of the depth thereof.

15. The spacer member of claim 8 wherein said plurality of arms include three disposed radially extending arms.

16. The spacer member of claim 8 wherein said plurality of arms include two radially extending arms.

* * * * *